Reissued Oct. 5, 1926. Re. 16,435

UNITED STATES PATENT OFFICE.

EARL E. SNOOK, OF BILLINGS, MONTANA.

MODELING CLAY.

No Drawing. Original No. 1,568,098, dated January 5, 1926, Serial No. 9,705, filed February 16, 1925. Application for reissue filed March 31, 1926. Serial No. 98,927.

The object of my invention is to provide a modeling clay or compound adapted for use in all kinds of modeling work such as the making of statuary, ornaments, bric-a-brac, frames and decorations for all kinds of woodwork.

A further object is to provide a modeling composition that is capable of adhering to and may be used in connection with any kind of wood, metal, glass or earthenware.

A further object is to provide a modeling composition which can be cut or carved, may be molded by the use of dies or by hand and will not crack, break off, peel, chip or become brittle.

A further object is to provide a composition which may be painted on or decorated with any and all kinds of artists' materials, will not be affected by heat or cold and will keep indefinitely and without deterioration in suitable sealed containers.

Other objects of the invention will appear from the following detailed description.

The invention consists generally in the composition as described and set forth in the claims.

In carrying out my invention, I provide the following ingredients in the proportions named for producing approximately 9 lbs. of the modeling clay. The proportions by weight of the material which I propose to use in my compound are as follows: 8 oz. gelatine glue; 11½ oz. water; 8 oz. boiled linseed oil; 1 lb. "titanox"; 6 lbs. 1 oz. extra bolted whiting; 3 oz. chrome yellow-dry; ½ oz. methyl salicylate.

These ingredients are thoroughly mixed and will produce a composition of such a consistency that it may be molded with the hands, will adhere to a surface to which it may be applied and carved or formed into any desired shape or configuration or design, and when the figure or design to be molded is completed, it may be decorated in any suitable way by artists' materials and when dry and set will of course maintain its form and appearance indefinitely.

The glue forms a binder, provides the necessary hardness and sets the finished product as formed or molded. It also aids in rendering the compound adhesive. The whiting serves as a filler. The oil toughens the product, combines with the titanox and makes it elastic and plastic. Water is added for thinning purposes, unites the materials and makes the compound pliable. After the product is molded or formed, the water evaporates, leaving the preparation hard and stiff. The salicylate acts as a preserving compound and prevents offensive odors which would otherwise appear. The chrome-yellow is for coloring purposes.

The compound which I am able to provide from the foregoing ingredients is easily workable and there is nothing of a poisonous nature in the material that would cause danger of infection to the user. I prefer to prepare the composition in substantially the following manner:

Dissolve the glue in water, using double boiler; while hot add the methyl salicylate. Mix the dry "titanox" with oil; add bolted whiting and dry chrome yellow, using an open container. Add the hot glue and water.

The mixture should then be kneaded, and afterwards placed in sealed containers. The product after being placed in the containers will become solidified, but returns to a pliable condition and ready for use by being warmed.

The "titanox" is made from titanium ore found in Norway, and Florida. It is a light fluffy mineral and has the appearance of chalk. One of its qualities is slipperiness and when wet adds to the working qualities of the clay.

I claim as my invention:

1. A plastic composition adapted to form a modeling clay comprising approximately 8 oz. of gelatine glue, 11½ oz. of water, 8 oz. of boiled linseed oil, 1 lb. of "titanox", 6 lbs. 1 oz. of bolted whiting, 3 oz. of chrome yellow and ½ oz. of methyl salicylate.

2. A plastic composition adapted to form a modeling clay comprising approximately 8 oz. of glue, 11½ oz. of water, 8 oz. of boiled linseed oil, 6 lbs. 1 oz. of whiting a suitable coloring, and ½ oz. of methyl salicylate.

3. A plastic composition adapted to form a modeling clay, comprising eight ounces of glue, eleven and one-half ounces of water, eight ounces of linseed oil, one pound of "titanox," and six pounds one ounce of whiting.

4. The method of forming a plastic composition for use as a modeling clay which consists in mixing dry "titanox" with oil, adding a filler, dissolving an adhesive in water and heating the mixture, adding methyl salicylate and then kneading the mixture.

5. The composition obtained by separately dissolving approximately eight ounces of glue in approximately eleven and one-half ounces of water; separately mixing one pound of dry "titanox" with eight ounces of linseed oil and then adding six pounds of whiting to the "titanox" oil mixture; adding the hot water solution of glue; and then kneading the mixture.

6. A plastic composition adapted to form a modeling clay consisting of glue, linseed oil, whiting and a suitable coloring adapted when mixed to form a material of dough-like consistency.

7. A plastic composition adapted to form a modeling clay comprising approximately 8 oz. of gelatine glue, 11½ oz. of water, 8 oz. of boiled linseed oil, 1 lb. of "titanox", 6 lbs. 1 oz. of bolted whiting, and ½ oz. of methyl salicylate.

In witness whereof, I have hereunto set my hand this 26 day of March 1926.

EARL E. SNOOK.